United States Patent [19]

Cosimati

[11] Patent Number: 5,210,999
[45] Date of Patent: May 18, 1993

[54] CHILI HARVESTER

[75] Inventor: Robert O. Cosimati, Las Cruces, N. Mex.

[73] Assignee: Crown Farming Systems, Inc., Las Cruces, N. Mex.

[21] Appl. No.: 840,272

[22] Filed: Feb. 24, 1992

[51] Int. Cl.$^5$ .......................................... A01D 45/24
[52] U.S. Cl. .................. 56/327.1; 460/142; 171/129
[58] Field of Search .............. 56/126, 127, 128, 327.1, 56/330, DIG. 19; 460/123, 133, 143, 142; 171/129

[56] References Cited

U.S. PATENT DOCUMENTS

| | | | |
|---|---|---|---|
| 3,775,953 | 12/1973 | Poutsma | 56/126 |
| 3,855,760 | 12/1974 | Smith, Jr. et al. | 56/13.2 |
| 3,998,035 | 12/1976 | Towson, Jr. | 460/142 X |
| 4,028,867 | 6/1977 | Wolstenholme | 460/142 X |
| 4,546,602 | 10/1985 | Cosimati | 56/327.1 |

*Primary Examiner*—David J. Bagnell
*Attorney, Agent, or Firm*—Jacobson, Price, Holman & Stern

[57] ABSTRACT

A chili harvester in the form of a vehicle that is self propelled for movement along rows of chili pepper plants and including rotatably driven picking units for removing chili pods from the plants and depositing them onto rearwardly and upwardly extending conveyors which deposit the chili pods and any leaves, stems or other trash material into a rotatable separating drum. The rotating separating drum is mounted and driven for rotation about an inclined axis with the chili pods and other material being deposited in the upper end thereof and migrating forwardly toward the lower end with trash and other material dropping between circumferentially spaced members which form the separating drum. The chili pods which have been separated from the leaves, stems and other trash are discharged onto a rearwardly extending conveyor having a bench positioned alongside thereof to receive personnel which can finally inspect the chili pods and remove any undesirable chili pods and any remaining trash with the cleaned and separated chili pods then being discharged into a trailing dump trailer unit. The separating procedure also includes an air discharge unit to assist in moving material into and through the separating drum to enhance the separating operation in the separating drum.

18 Claims, 6 Drawing Sheets

CHILI HARVESTER

BACKGROUND OF THE INVENTION

1. Field of the Invention

A chili harvester in the form of a vehicle that is self propelled for movement along rows of chili pepper plants and including rotatably driven picking units for removing chili pods from the plants and depositing them onto rearwardly and upwardly extending conveyors which deposit the chili pods and any leaves, stems or other trash material into a rotatable separating drum. The rotating separating drum is mounted and driven for rotation about an inclined axis with the chili pods and other material being deposited in the upper end thereof and migrating forwardly toward the lower end with trash and other material dropping between circumferentially spaced members which form the separating drum. The chili pods which have been separated from the leaves, stems and other trash are discharged onto a rearwardly extending conveyor having a bench positioned alongside thereof to receive personnel which can finally inspect the chili pods and remove any undesirable chili pods and any remaining trash with the cleaned and separated chili pods then being discharged into a trailing dump trailer unit. The separating procedure also includes an air discharge unit to assist in moving the material into and through the separating drum and to enhance the separating operation in the separating drum.

2. Description of the Prior Art

My prior U.S. Pat. No. 4,546,602 discloses a chili pepper harvester with forwardly disposed, rotatably driven picking units combined with conveyor structure to collect the chili pods removed from the plants by the picking units. This patent and the prior patents cited therein are incorporated as prior art in this application.

While various types of harvesters with picking units and conveyors are well known, the prior art does not include a mobile vehicle with a rotatable separating drum associated with the conveying units to separate leaves, trash, stones, dirt, stems and the like from the chili pepper pods. The prior art also fails to disclose the specific arrangement of conveyor units including a final inspection conveyor associated with a bench for personnel to remove undesirable chili pods and any remaining trash or other material with the finally inspected chili pods then being conveyed to a dump trailer attached to the self propelled chili harvester.

SUMMARY OF THE INVENTION

An object of the present invention is to provide a chili harvester in the form of a self propelled vehicle having operator controls located within a cab with the harvester including forwardly positioned picking units rotatably supported and driven for rotation about generally longitudinal axes for picking and stripping chili pods from chili pepper plants as the harvester moves along multiple rows of chili pepper plants.

Another object of the invention is to provide a chili harvester in which the picking units are oriented in transversely spaced relation for registry with rows of chili pepper plants with each picking unit including an upwardly and rearwardly extending conveyor along opposite sides of the harvester with the two side conveyors discharging into a single conveyor which extends rearwardly and upwardly to the rear of a separating drum.

A further object of the invention is to provide a chili harvester in accordance with the preceding objects in which the separating drum is supported and driven for rotation about an inclined axis with the rearward end of the drum being elevated in relation to the forward end with the chili pods and any removed trash, leaves, stems or the like being deposited in the upper rearward end of the drum which is in the form of a generally cylindrical member with the peripheral wall thereof being defined by a plurality of circumferentially spaced rods or tubes which enable trash and leaves as well as stems or other small material to drop therethrough thus separating the chili pods from the trash material and also sizing the chili pods inasmuch as chili pods of a predetermined size will be retained within the drum with smaller chili pods being dropped therefrom for discharge onto the field.

Still another object of the invention is to provide a chili harvester in accordance with the previous objects in which air is discharged into the chili pods and trash as they enter the rearward upper end of the separating drum to facilitate separation of the trash and movement of the material into and through the separating drum to enhance the separation of the chili pods with trash or other unwanted material being discharged back onto the ground surface.

Yet another object of the invention is to provide a chili harvester in accordance with the preceding objects in which the separated chili pods leaving the separating drum are deposited on a horizontally disposed longitudinally extending conveyor having a seat, such as a bench seat alongside thereof to accommodate final inspection personnel who will physically observe the chili pods and remove any remaining trash or undesirable chili pods from the conveyor and deposit them back onto the ground surface with the finally inspected chili pods then being conveyed rearwardly into a towed dump trailer connected to the rearward end of the harvester thereby collecting the separated and cleaned chili pods which can be dumped into a truck or other vehicle at periodic intervals as the trailer is filled.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Referring now specifically to the drawings, the chili harvester of the present invention is designated by reference numeral 20 and is in the form of a self propelled mobile vehicle generally designated by reference numeral 22 including forwardly extending picking units 24, conveying units 26 which extend longitudinally along each side of the machine, a transverse conveying unit 28 to combine all of the material picked into a single flow path formed by a longitudinal conveyor 30 which discharges the material into an inclined chute 32 which has an air line 34 associated therewith with the material then being discharged into the upper rearward end of a separating drum 36 to separate the trash from chili pods which are discharged onto a chute 38 which extends laterally at the front of the drum 36 for discharging the separated chili pods onto a rearwardly extending conveyor 40 having a bench seat 42 extending alongside thereof with the conveyor 40 discharging the chili pods into a rearwardly and upwardly inclined conveyor 44 that discharges the cleaned pods into a towed dump trailer 46. The vehicle 22 includes frame structure 48, drive wheels 50, steerable wheels 52, an operator's cab 54 which includes the usual control arrangements 56 by which an operator can operate and control the movement characteristics of the vehicle and also operate and control the various powered units of the harvester. The vehicular structure itself is conventional and provided with a prime mover such as an internal combustion engine with suitable drive connections and transmission arrangements to provide output power for driving the vehicle and providing a power source for the driven components of the chili harvester either by transmission of mechanical power or through the use of a hydraulic pump to supply pressurized hydraulic fluid to hydraulic motors for powering the components of the harvester. The details of the drive mechanisms and control arrangements are not disclosed since they are substantially standard components arranged in a conventional manner.

Figure 4:
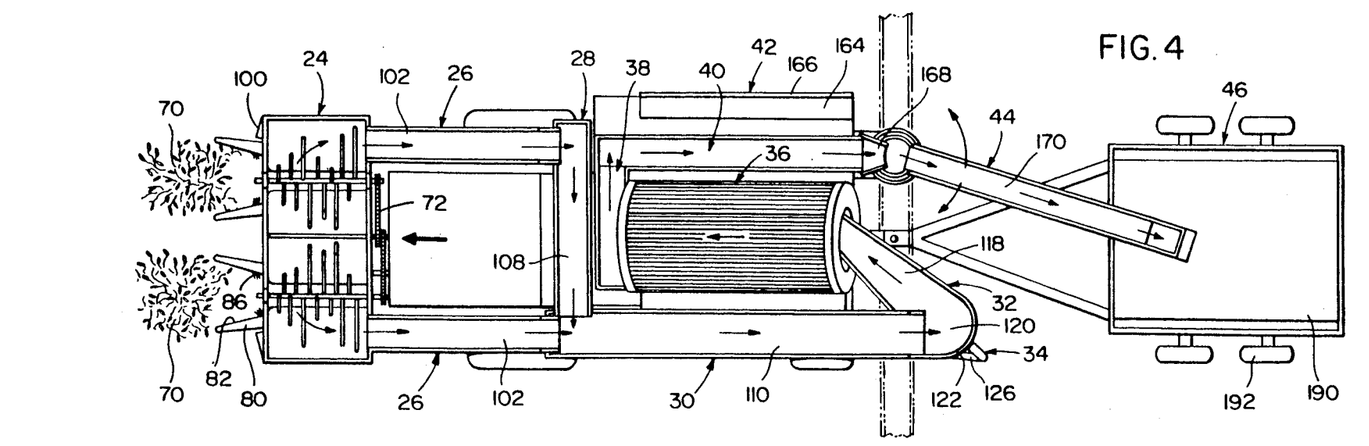
FIG. 4 is a generally schematic plan view illustrating the flow of material in the chili harvester.
Figure 5:
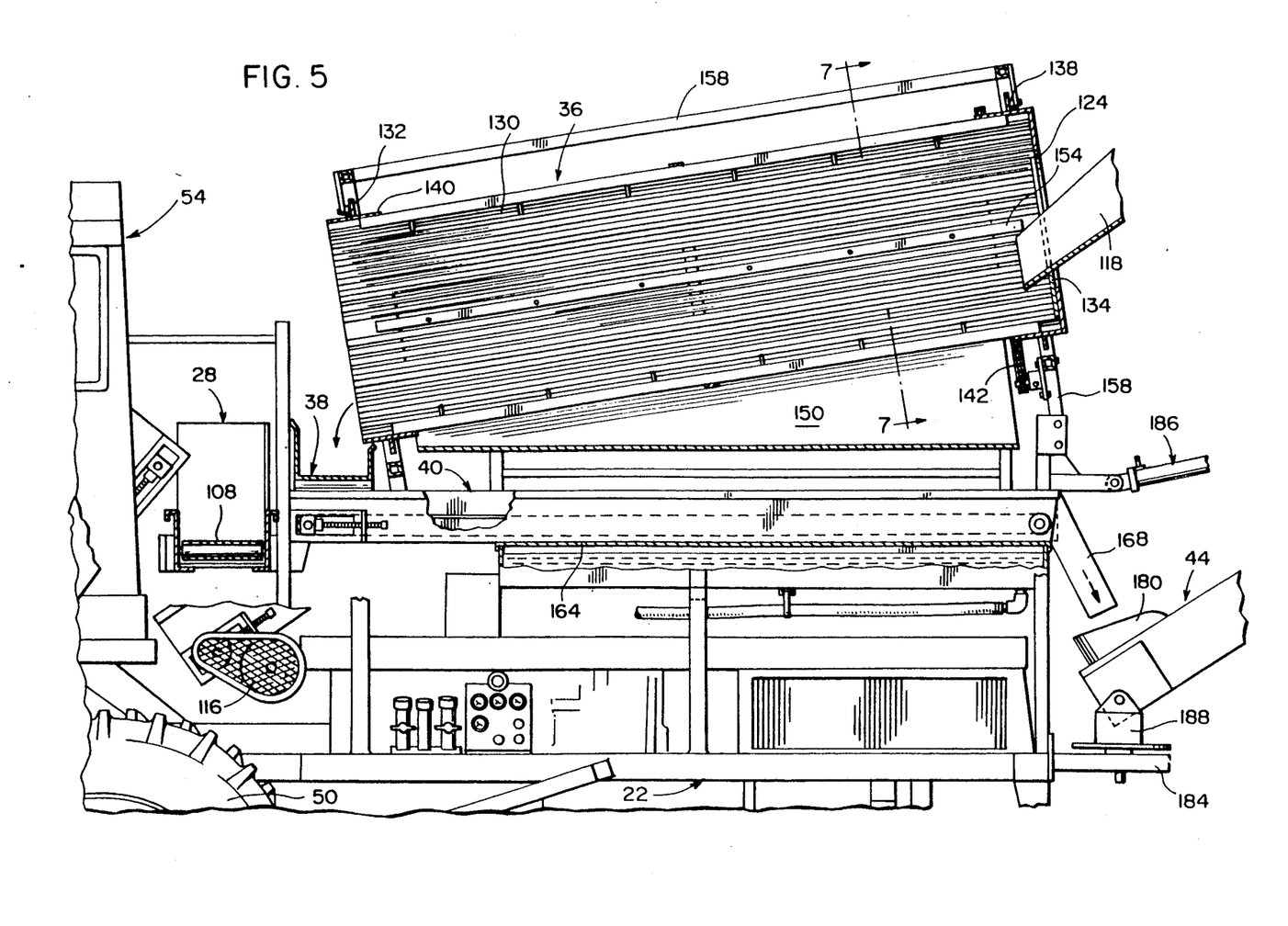
FIG. 5 is a longitudinal sectional view of a portion of the chili harvester illustrating the structure of the separating drum.
Figure 8:
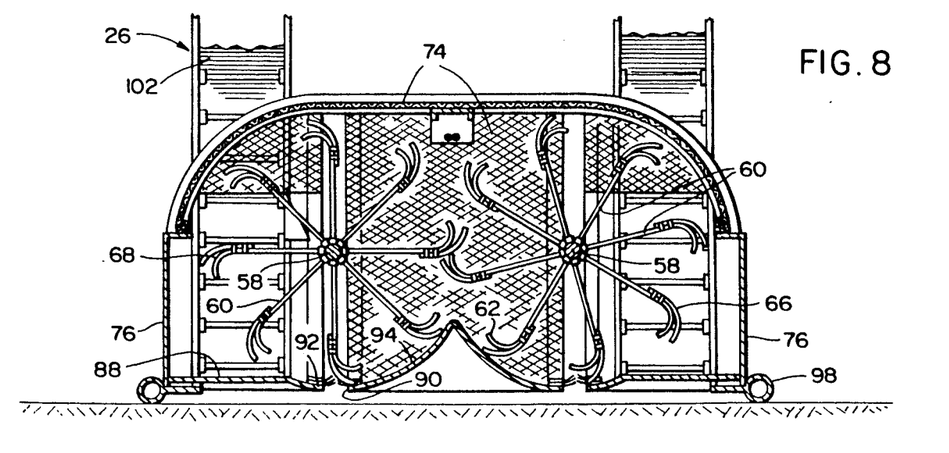
FIG. 8 is a transverse sectional view of the picking units.
Figure 9:
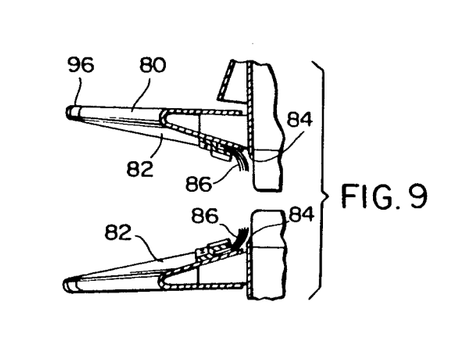
FIG. 9 is a detailed sectional view taken along section line 9—9 at the forward end of the picking units illustrating the structure for guiding the chili pepper plants into the picking units.
Figure 12:
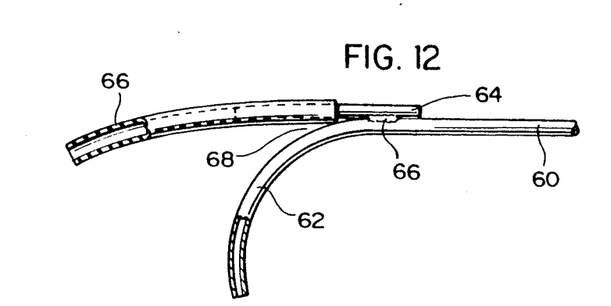
FIG. 12 is a detailed view illustrating the construction of one of the picking elements utilized in the picking units.

The picking units 24 are somewhat similar to the picking units disclosed in my prior U.S. Pat. No. 4,546,602 and include a pair of generally horizontally disposed, longitudinally extending powered shafts 58 provided with a plurality of radially extending arms 60 thereon with the outer end of each arm 60 being curved at 62 generally into a hook-shaped configuration. Attached to each arm 60 is a mounting finger 64 attached to the arm 60 as by welding 66 or the like adjacent the curved end 62 and projecting longitudinally therefrom for supporting an elongated flexible tubular finger 66 as illustrated in FIG. 12 with the outer end of the member 64 curving slightly toward the curved portion 62 of the arm 60 and the flexible resilient picking finger 66 also curving slightly in that direction to provide a generally V-shaped picking area or throat 68 which will receive the stem of chili pods that are on chili pepper plants 70 and strip the pods from the stems with the stripping action also removing some of the stems and leaves. The shafts 58 are driven from a suitable hydraulic motor, power take off or the like through chain drives 72 as illustrated in FIG. 4. A housing or shroud in the form of screen material 74 extends above the picking units and the sides thereof are formed by side panels 76 as illustrated in FIG. 8. The front of the picking unit includes forwardly facing wall segments 78 and spaced guide members 80 which have inclined surfaces 82 converging rearwardly toward an entrance opening 84 in the front wall 78 with flexible guide finger elements 86 deflecting the plant leaves and pods into the entrance area. The bottom of the picking unit is provided with bottom plates 88 with slot-like openings 90 enabling the plant stalks to enter the picking unit. As illustrated in FIG. 8, the bottom plates 88 include curved portions 92 and the portion of the bottom plate 88 between the slots 90 includes upwardly extending curved portions 94 generally following the arcuate path of movement of the picking fingers 62, 66 at the end of the arms 60 so that the pods stripped from the plants will be conveyed in a circular path as the picking fingers move inwardly and upwardly along the curved surface 94. The lower ends of the guides 80 may be provided with skids 96 and the outer edges of the side plates 76 may also be provided with cylindrical skid and seal members 98 to control the position of the picking units in relation to the ground surface as the picking units traverse the ground surface along the rows of plants 70. Suitable bearing and support structures are provided for the shafts 58 at both the front and rear thereof and the front wall 78 may be provided with a curved deflector 100 that deflects material that passes outwardly of the guides 80 outwardly of the side wall 76 and front wall 78.

Figure 3:
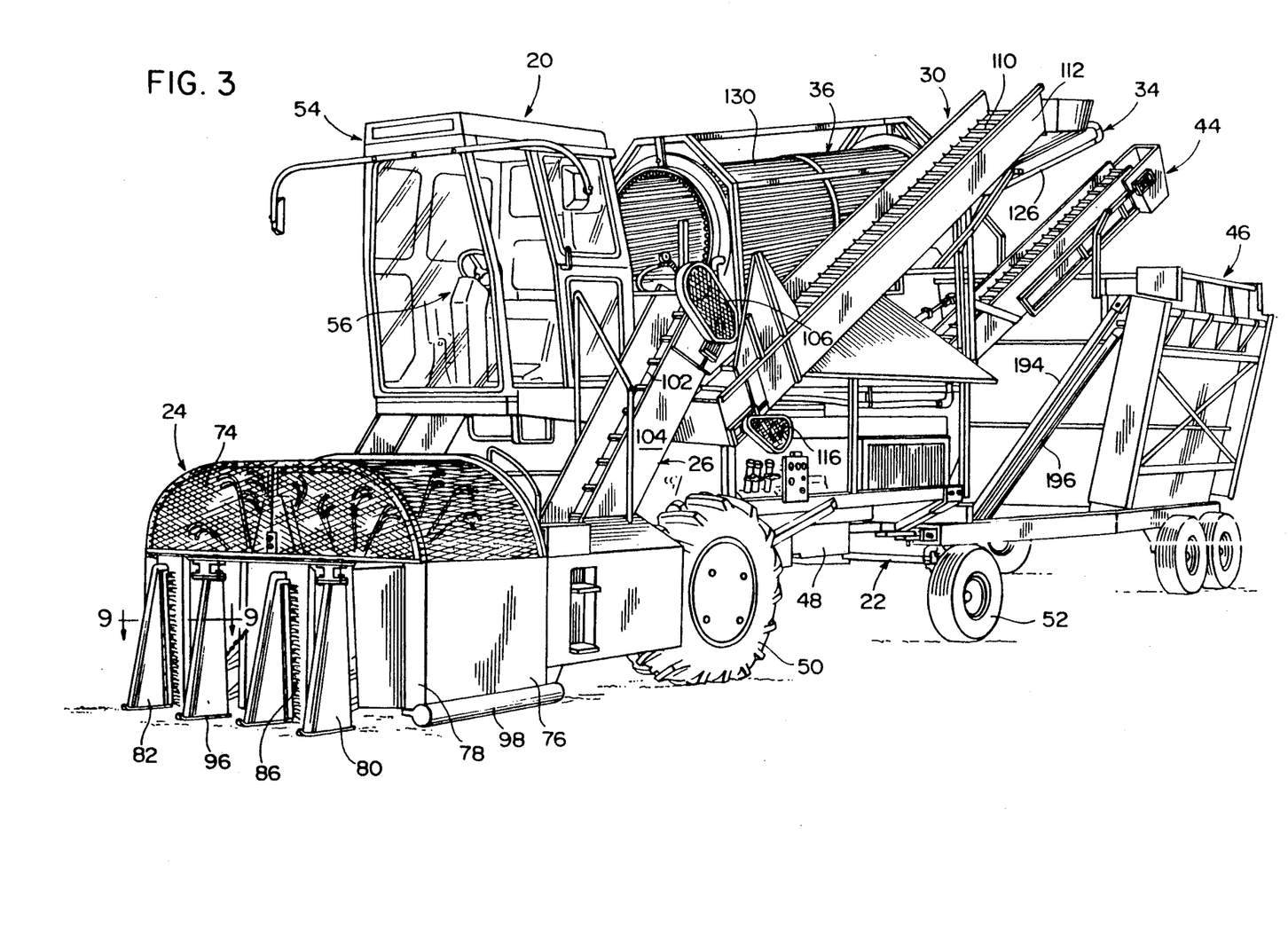
FIG. 3 is a perspective view of the chili harvester taken from the front and side of the harvester as illustrated in FIG. 1.

The pods and other material removed from the plants will be deposited on the side conveyors 26 each of which includes a cleated belt 102 supported in a suitable frame structure 104 and end rollers with adjustments 106 to maintain the belts in proper driving relation with the conveyor belts 102 being driven by drive mechanism 106 to elevate the material received from the picking unit upwardly and rearwardly alongside of the cab 54 as illustrated in FIG. 3 for deposit into the lower end of the conveyor 30. As illustrated in FIG. 4, the conveyor 26 on the side of the harvester opposite to that of the conveyor 30 deposits material into the transverse conveyor 28 which has a similar cleated conveyor belt 108 to transfer all of the material from conveyor 26 at the opposite side of the harvester onto the conveyor 30 which is also constructed with a cleated belt 110 mounted in a suitable frame structure 112 with adjustable end roller structure 114 and a drive mechanism 116 to convey all of the material upwardly and rearwardly for discharge into the chute 32.

Figure 6:
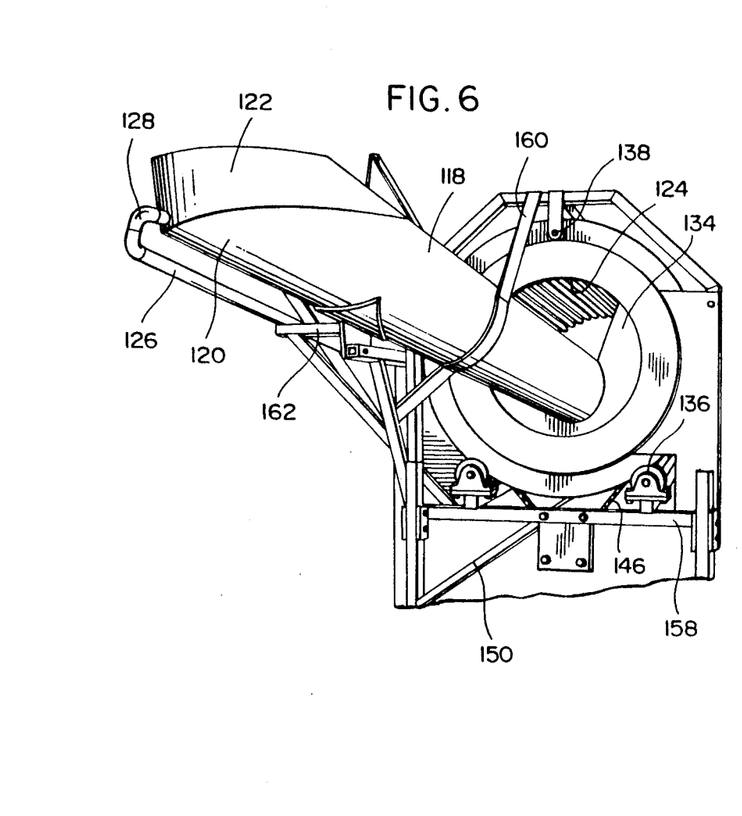
FIG. 6 is a rear elevational view of the separating drum illustrating the chute and air pipe associated therewith.

As illustrated in FIG. 6, the chute 32 includes a forwardly and downwardly inclined trough 118 of generally semi-cylindrical configuration with the rearward end of the trough 118 being enlarged into a generally circular configuration at 120 and provided with an upstanding curved wall 122 which assures that all material discharged from the conveyor 30 into the circular area 120 will be retained by the wall 122 and guided onto the downwardly inclined trough 118 which tapers slightly into semi-cylindrical configuration and enters the open center 124 of the separating drum 36. Also as illustrated in FIG. 6, an air pipe 126 connected with a suitable supply tank and compressor is communicated with the interior of the wall 122 by a reverse curved fitting 128 at the upper end thereof for discharging air above the upper surface of the circular area 122 and the internal surface of the trough 118 for discharge toward the separating drum 36 which helps to move the chili pods, leaves, stems and other trash that were picked up by the picking units and conveyed upwardly along the conveyors 26, 28 and 30 and discharged onto the chute 32 and into and through the separating drum 36. The introduction of air agitates the material and enhances separation by the separating drum by facilitating separation of the leaves, trash and stems from the chili pods.

Figure 7:
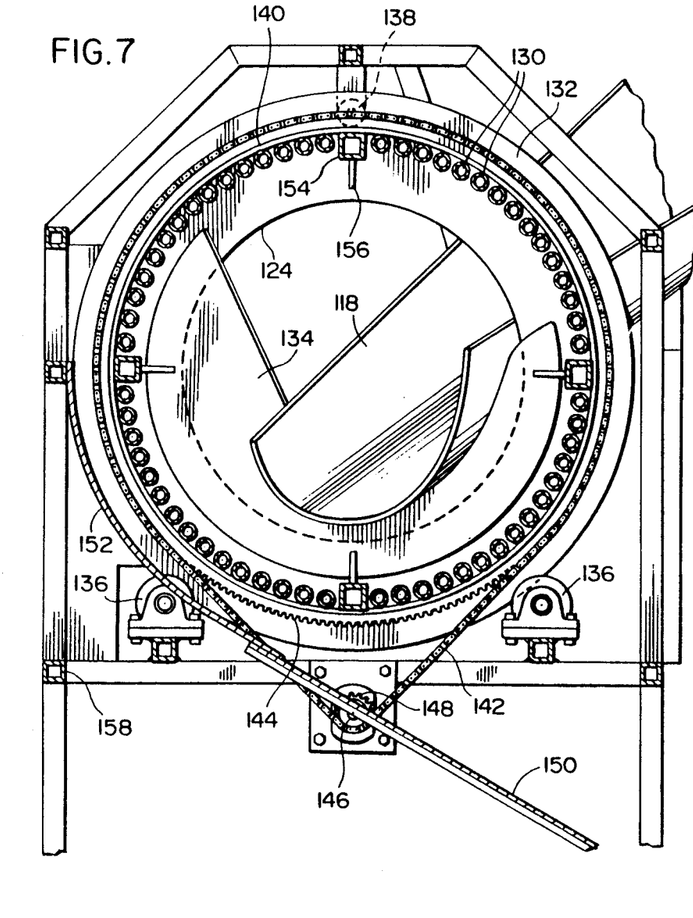
FIG. 7 is a transverse sectional view taken along section line 7—7, on an enlarged scale, illustrating the specific structure of the separating drum.

As illustrated in FIG. 7, the separator drum 36 is formed by a plurality of tubes or pipes of rigid construction which may be solid rods or tubes 130 connected to annular rings 132 at each end thereof with the rearward annular ring defining the opening 124 and the forward annular ring forming a discharge onto the chute 38. As illustrated in FIG. 7, the trough 118 enters the open rear end 124 of the drum and discharges material interiorly thereof with a retaining plate or baffle 134 receiving the lower surface of the trough 118 to retain all material therein with the baffle being fixed to the trough 118 in a manner which permits the drum 36 to rotate. The exterior of the annular members 132 include a flange engaged and supported by spaced bottom rollers 136 which are grooved to receive the flange on the annular member 132. A top roller 138 is provided to retain the drum on the pair of the rollers 136 with the top roller 138 engaging a flat outer surface 140 on the annular member 132. The drum 36 is driven by a sprocket chain 142 engaging a peripheral gear 144 at the rear of the drum and a suitable hydraulic motor 146 having a pinion sprocket gear 148 drivingly engaged with the chain 142. As illustrated in FIG. 7, a laterally extending chute 150 in the form of a panel underlies the drum and discharges trash, leaves and similar material laterally back onto the ground surface with the chute 150 including a curved extension 152 which extends upwardly around a portion of the periphery of the drum. Also, the drum includes longitudinal frame members 154 having inwardly extending flanges or paddles 156 rigid therewith to lift and tumble the material in the interior of the drum as it is rotated to further facilitate separation of the chili pods from the trash and other material. As illustrated, the drum and associated structure is supported by suitable framing 158 and the trough 118 is supported by a metal strap structure 160 and the various conveyors and water pipelines are also supported by framing 162 which are of conventional components arranged in a manner to rigidly support the components as described.

Figure 1:
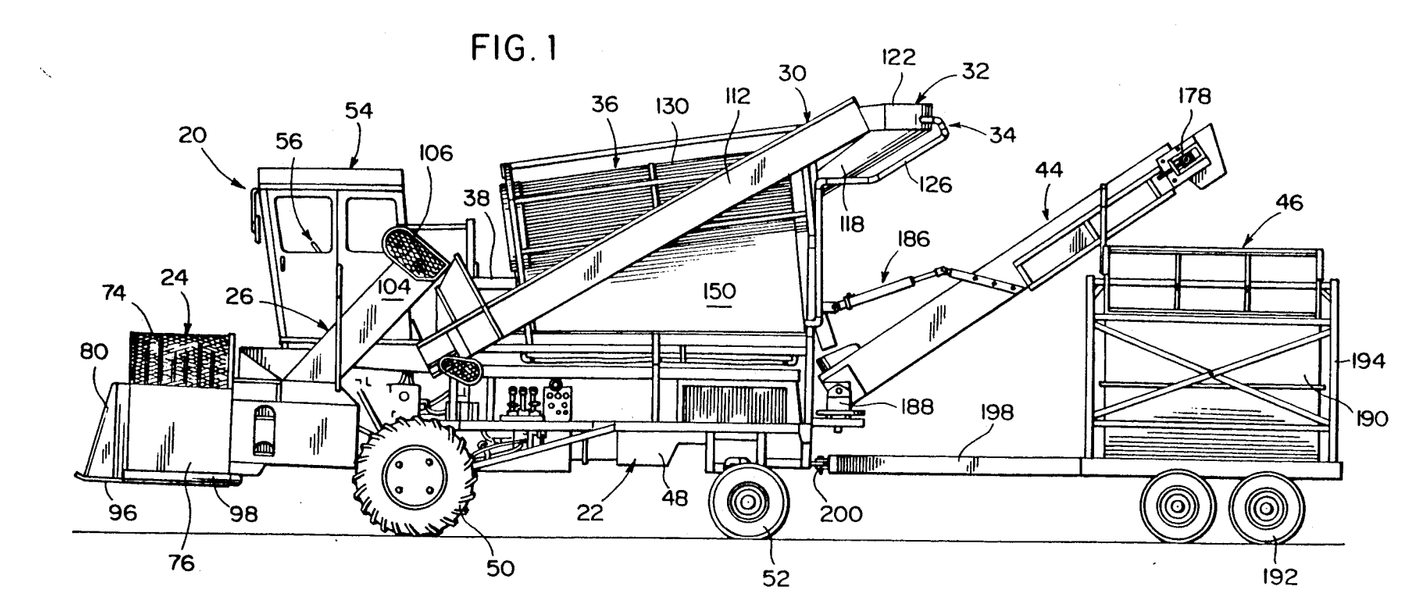
FIG. 1 is a side elevational view of the chili harvester of the present invention.
Figure 2:
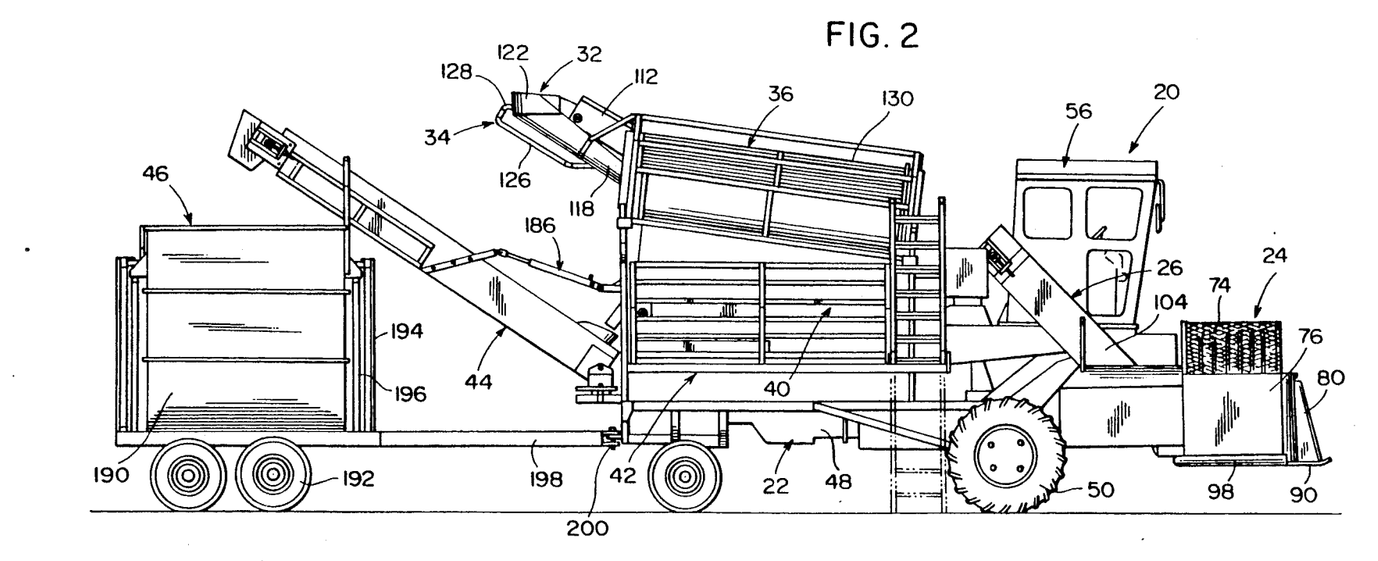
FIG. 2 is a side elevational view of the chili harvester taken from the side opposite to FIG. 1.
Figure 10:
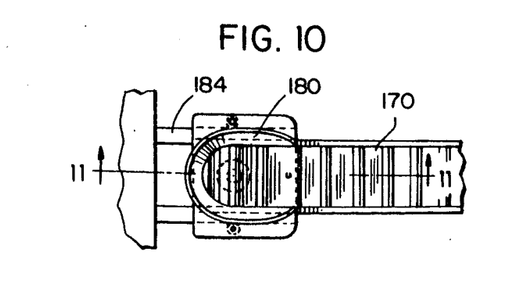
FIG. 10 is a detailed plan view of the conveyor to move the finally inspected chili pods into the trailer.
Figure 11:
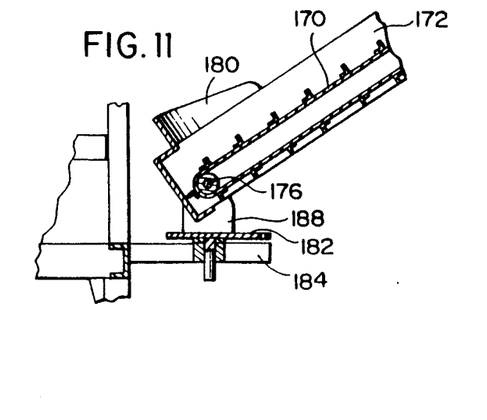
FIG. 11 is a sectional view taken along section line 11—11 on FIG. 10 illustrating further structural details of this conveyor.

As the material is discharged into the rotatable separating drum 36, it will move forwardly and downwardly due to the inclination of the rotating drum 36 and chili pods will be deposited onto the laterally extending and downwardly inclined chute 38 at the forward end of the drum 36 for discharge of the separated chili pods onto the horizontal conveyor 40 which extends alongside of the separating drum 36 and alongside of the bench seat 42 which includes a seat 164 and a seat back 166. The bench seat 42 receives personnel positioned thereon so that they have access to the conveyor 40 which includes a cleated belt structure and the personnel can finally inspect the chili pods as they pass along the conveyor 40 and remove any undesired chili pods or any remaining trash, leaves or the like so that only selected chili pods are discharged from the conveyor 40 with any material removed from the conveyor 40 being deposited outwardly onto the ground surface. As illustrated in FIG. 4, the conveyor 40 includes a discharge chute 168 which discharges material onto the laterally adjustable, upwardly inclined and adjustable conveyor 44 for discharge into the trailer 46 with FIGS. 10 and 11 illustrating the structure of the conveyor 44 as including a cleated belt 170 and a suitable supporting frame 172 and end rollers 176, one of which is adjustable at 178 and which is driven by a suitable hydraulic motor or the like (not shown). The conveyor 44 includes a guide structure 180 for receiving material from the chute 168 and the conveyor 44 is supported rotatably by a turntable structure 182 from a frame structure 184 to enable the conveyor 44 to be oriented in any angular position about a generally vertical axis defined by the turntable 182 so that the chili pods can be either deposited into the trailer 46 or another vehicle moving alongside of or connected alongside of the harvester 20 with the alternative positions of the conveyor 44 being illustrated in broken line in FIG. 4. Also, the vertical inclination of the conveyor 44 may be adjusted by a piston and cylinder assembly 186 about the axis of the lower roller 176 and bracket structure 188. The trailer 46 includes a hopper body 190 and supporting wheels 192 and a supporting framework 194 which includes a piston and cylinder assembly 196 by which the hopper 190 can be elevated and tilted to dump the trailer into another vehicle or the like. The trailer also includes a forwardly extending tongue 198 connected to the harvester by a hitch structure 200 as illustrated in FIG. 2.

When using the harvester, the vehicle is maneuvered and controlled in a manner to propel it forwardly with the guides 80 on the picking units receiving a row of pepper plants as the harvester moves forward. The picking arms are rotated to cause the curved member 62 and the flexible fingers 66 to move upwardly and inwardly in relation to the plants with the pods being stripped therefrom by the stems of the pod entering the throat 68 and the pods being pulled from the stalk. As the arms move in a downward direction in their path of movement, the stripped pods will drop from the arms and be conveyed to the rear by the conveyor structures 26, 28 and 30 with all of the material, including chili pods, some leaves and possibly some stems, being discharged onto the chute 32 from which it moves by gravity, assisted by air flow, into the rotating separating inclined drum 36 with the spacing between the tubes of the drum enabling trash, stems and leaves to be discharged downwardly onto the inclined chute or panel 150. The cleaned and separated pods are then discharged from the front of the drum 36 onto the chute 38 which is inclined for discharge onto the longitudinal conveyor 40. Personnel on the bench seat 42 removes any residual trash and undesirable pods by picking up such material and throwing it laterally onto the ground surface. The chili pods are then discharged from the rearward end of the conveyor 40 into the conveyor 44 for discharge into the trailer 46 thereby providing a chili harvester which not only picks the chili pepper pods from the plants but also separates the trash from the pods and enables separation of smaller pods and undesirable pods with the harvested and cleaned pods being deposited into a trailer type vehicle with a hopper body thereby providing a self-contained, mobile harvester which can be operated by a single individual oriented in the cab 54 in a manner to be able to observe all of the operations of the device with the controls 56 providing proper control for the harvester.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A harvester for removing vegetative pods from row plants and separating the pods from trash such as leaves, stems and other unwanted material and discharging the separated pods into receptacle means, said harvester comprising a self-propelled steerable vehicle, pod picking means located forwardly of the vehicle for removing pods from the plants as the vehicle moves forwardly, conveyor means on the vehicle for conveying removed pods and other material received from the picking means rearwardly and upwardly in relation to the vehicle, a separating drum mounted on the vehicle for rotation about an inclined axis with the conveying means discharging pods and other material into an upper end of the inclined drum, said separating drum being rotatably driven about an inclined axis and including peripheral openings capable of discharging material smaller than the pods therethrough as the drum is rotated and conveyor means at a lower end of the separating drum for receiving separated pods therefrom and conveying the separated pods to the receptacle means.

2. The harvester as defined in claim 1 wherein said drum is mounted on the vehicle with the rotational axis of the drum extending longitudinally of the vehicle.

3. The harvester as defined in claim 2 wherein the upper end of the inclined drum is located rearwardly of the lower end with the conveyor means extending from the picking means and conveying the pods and other material upwardly and rearwardly and means discharging the material from the conveyor means from the picking means into the rearward upper end of the drum.

4. The harvester as defined in claim 3 wherein said drum has an open upper rearward end, an inclined chute extending into the upper end of the drum, said chute including an enlarged area underlying a discharge end of the conveyor means from the picking means and air line connected with the chute for discharging air over the upper surface thereof for facilitating movement of material into the drum and facilitating separation of other material from the pods.

5. The harvester as defined in claim 4 wherein said chute includes a generally circular area underlying a discharge end of the conveyor means from the picking means, an upstanding peripheral wall around a portion of the flat circular area, said air line including a discharge extending through the wall on the circular plate forming part of the chute.

6. The harvester as defined in claim 5 wherein the chute includes a longitudinal portion of generally semicylindrical configuration extending into the open end of the drum, a baffle around the portion of the chute extending into the drum to deposit material interiorly of the drum.

7. The harvester as defined in claim 6 wherein said drum includes annular end members having a radially exending peripheral flange, said peripheral flanges being supported by grooved bottom rollers spaced laterally from the bottom center of the drum.

8. The harvester as defined in claim 7 wherein said drum includes an outwardly exposed ring gear on the external surface thereof, a drive chain connected with the ring gear and being driven by a motor and drive gear engaged with the chain.

9. The harvester as defined in claim 2 wherein said picking means includes a pair of picking units, a housing enclosing the picking units, outwardly flared guide means engaging each row of plants with the housing including an entrance slot enabling the plants to enter the housing, a pair of rotatably driven shafts in the housing with radially extending picking arms mounted on each of the shafts for engaging the plants and removing pods therefrom.

10. The harvester as defined in claim 9 wherein said conveyor means receiving separated pods from the separating drum includes a longitudinally disposed, generally horizontal conveyor, a seat positioned alongside the horizontal conveyor to receive personnel to remove any remaining unwanted material undesirable pods from the conveyor prior to discharge into the receptacle means.

11. The harvester as defined in claim 10 wherein the conveying means extending from the picking means to the separating drum includes a pair of side conveyors, a transverse conveyor interconnecting the side conveyors and discharging into a single side conveyor for discharge of all of the pods and other material into the separating drum.

12. The harvester as defined in claim 11 wherein the upper end of the inclined drum is located rearwardly of the lower end with the conveyor means extending from the picking means conveying the pods and other material upwardly and rearwardly and means discharging the material from the conveyor means from the picking means into the rearward upper end of the drum.

13. The harvester as defined in claim 12 wherein said drum has an open upper rearward end, an inclined chute extending into the upper end of the drum, said chute including an enlarged area underlying a discharge end of the conveyor means from the picking means and an air line connected with the chute for discharging air over the upper surface thereof and toward the drum for facilitating movement of material into the drum and facilitating separation of other material from the pods.

14. The harvester as defined in claim 1 wherein said conveyor means receiving separated pods from the separating drum includes a longitudinally disposed, generally horizontal conveyor, a seat positioned alongside the horizontal conveyor to receive personnel to remove any remaining unwanted material and undesirable pods from the conveyor prior to discharge into the receptacle means.

15. The harvester as defined in claim 1 wherein the conveying means extending from the picking means to the separating drum includes a pair of side conveyors, a transverse conveyor interconnecting the side conveyors and discharging into a single side conveyor for discharge of all of the pods and other material into the separating drum.

16. The harvester as defined in claim 1 wherein said picking means includes a pair of picking units, a housing enclosing the picking units, outwardly flared guide means engaging each row of plants with the housing including an entrance slot enabling the plants to enter the housing, a pair of rotatably driven shafts in the housing with radially extending picking arms mounted on each of the shafts for engaging the plants and removing pods therefrom.

17. The harvester as defined in claim 16 wherein each of said picking arms includes a radially extending rod having a curved, hook-shaped outer end, a flexible finger attached to the outer end of each of said arms in diverging relation to the curved hook-shaped end to define a generally V-shaped outwardly facing throat to receive pod stems therein whereby the throat will engage the pods and separate the pods, stems and some leaves from the plants for deposit on the conveyor means.

18. The harvester as defined in claim 1 wherein the receptacle means includes a towed dump trailer articulately connected to the vehicle in trailing relation thereto with the conveyor means receiving the pods from the separating drum including an upwardly inclined conveyor receiving separated pods and discharging them into the trailer.

* * * * *